3,165,482
POLYMERS FROM N-HETERO-BICYCLO ALKANES AND PROCESS FOR PRODUCING SAME
Henry K. Hall, Jr., Wilmington, Del., assignor to E. I. du Pont de Nemours and Company, Wilmington, Del., a corporation of Delaware
No Drawing. Filed July 13, 1962, Ser. No. 209,761
12 Claims. (Cl. 260—2)

This invention relates to novel polymeric amines and methods of making the same, and more particularly to polymers obtained from certain bicycloalkanes containing one or two nitrogen atoms in the ring system.

It is an object of this invention to produce certain novel nitrogen-containing polymers. Another object of this invention is to produce certain novel fiber and/or film-forming polymers of unique molecular structure. Other objects will appear hereinafter.

In accordance with this invention certain novel polymeric compositions are provided. In one case the polymeric composition has recurring structural units of the formula:

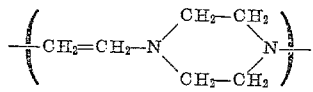

and in the other case recurring structural units of the formula:

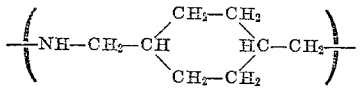

There are more than 5 of the recurring units per polymer molecule.

The foregoing polymeric compositions are prepared by polymerization in the presence of an organic sulfonic acid of certain bicycloalkanes having one or two nitrogen atoms in their rings, which rings are of the relatively unstrained 6- or 7- member type. In particular the nitrogen containing bicycloalkanes, notably the compounds 1,4-diazabicyclo [2.2.2]octane and 3-azabicyclo[3.2.2]nonane, are heated with 0.01 to 5% by weight of an organic sulfonic acid at temperatures in the range of 100–300° C., optionally in an inert medium. Preferably a temperature is employed in the range of 150–250° C. to attain adequate yields in practical periods of time while minimizing degradation of the polymer so formed. The polymerization period may be as short as a few minutes or as long as several days. In general, shorter reaction periods are possible when the temperature is in the higher portion of the range.

Benzenesulfonic acid and p-toluenesulfonic acid are typical catalysts that may be used in the practice of this invention. These or other catalysts are preferably employed in their anhydrous state, the presence of water being detrimental to the polymerization reaction.

The polymerization may optionally be carried out in an inert medium, either solvent or diluent, such as tetramethylene sulfone, 2-nitropropane, decahydronaphthalene, and tetrahydronaphthalene. The presence of a solvent or diluent will aid in the exclusion of oxygen during the polymerization and thus further the attainment of a product having superior qualities.

Polymerization of the nitrogen-containing bicycloalkanes according to this invention proceeds in the case of 1,4-diazabicyclo[2.2.2]octane, according to the reaction:

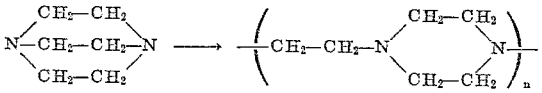

and in the case of 3-azabicyclo[3.2.2]nonane according to the reaction:

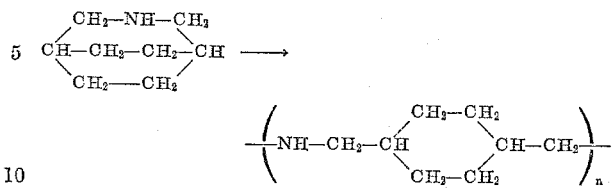

As hereinbefore indicated, in the above polymers $n$ is a whole number greater than 5. In most cases the degree of polymerization will be sufficiently great that the polymer is of a high molecular weight, ordinarily film forming and/or fiber forming. Commonly the ends of the polymer chains will be terminated by fragments derived from the surroundings, for example, hydrogen and sulfonoxy groups from the catalyst. The foregoing nitrogen containing bicycloalkanes should be essentially the sole polymerizable component such that the polymer will consist of the recurring units in the above formulas.

The following examples illustrate this invention, but should not be construed as limiting it in any respect. In these examples, all parts are by weight unless otherwise stated.

All values of inherent viscosity in the specification and claims are calculated from the equation:

$$\text{Inherent viscosity} = \frac{\ln R}{C}$$

wherein $R$ is the viscosity of a solution of 0.5 gram of the polymer in 100 milliliters of solvent at 30° C. divided by the viscosity of the solvent in the same units and at the same temperature, and $C$ is the concentration of the polymer solution in grams of polymer per 100 milliliters of solution. In most cases m-cresol will be the solvent and the inherent viscosities of the polymers of the invention therein will be at least 0.30.

*Example I*

A mixture of 100 parts of 1,4-diazabicyclo[2.2.2]octane, known in the trade as triethylenediamine, and 0.5 part purified p-toluenesulfonic acid is placed in a heavy walled glass tube. The air is removed from the tube, the tube sealed, and then the tube is heated at 150° C. for 1 week. Upon opening the tube, it is found to contain 33 parts of white solid polymer, together with unpolymerized monomer.

The polymer, freed of residual monomer, is infusible at temperatures below 390° C., but begins to darken above 210° C. It is found to have an inherent viscosity of 0.51 in 0.1 N aqueous hydrochloric acid. The polymer is soluble in 98% formic acid or m-cresol, a solution in the former solvent leaving a soft film upon evaporation. Another sample of the polymer prepared in a similar fashion is found to have an inherent viscosity of 1.06 in m-cresol, and 2.11 in 99% formic acid.

*Example II*

Using 100 parts triethylenediamine, purified by sublimation at 100° C. and 15 mm. mercury (absolute), in a procedure similar to that in Example I, but with 0.79 part of pure benzenesulfonic acid as catalyst, about 97 parts of the polymer is obtained in 10 hours at 179–200° C. This polymer decomposes at temperatures above 230° C. without melting. The infrared spectrum of the polymer is consistent with a structure corresponding to poly-1,4-ethylenepiperazine, as is also indicated by its recovery unchanged after boiling with aqueous sodium hydroxide for 30 hours.

Samples of this polymer from several individual experiments exhibit inherent viscosities of 1.7–2.0 in m-cresol. End-group analysis, using 2,4-dinitrofluorobenzene reagent, of the sample of polymer having an inherent viscosity of 1.7 indicates a corresponding molecular weight of about 10,000.

In a similar experiment with 85% phosphoric acid in place of the benzenesulfonic acid, no polymer is obtained.

*Example III*

In one embodiment, the sulfonic acid catalyst may be conveniently employed in the form of its salt with the bicyclic amine being polymerized. One such salt is made by mixing 35.3 parts of redistilled benzenesulfonic acid with 11.22 parts of sublimed 1,4-diazabicyclo[2.2.2] octane in 315 parts of ethyl acetate. The resulting white precipitate is removed by filtration and recrystallized from ethyl alcohol to give 31.6 parts (73.7% yield) of white crystals, M.P. 297° C. on a heated bar, that analyzes for a salt having 2 moles of the sulfonic acid per mole of the bicyclic compound.

A mixture of 1,000 parts of sublimed 1,4-diazabicyclo [2.2.2]octane and 2.78 parts of the above sulfonate salt is placed into a heavy walled glass tube which is then alternately evacuated and flushed with dry nitrogen, and finally evacuated and sealed. The sealed glass tube is heated at 200° C. for a few minutes, shaken to insure uniform mixing of the reagents, and then allowed to remain at 200° C. for 10.7 hours. The mixture is converted to a solid white plug after about 1 hour. At the end of the 10.7 hour total heating period, the tough white plug of polymer is removed and comminuted; it is then extracted with ether, leaving 960 parts of white polymer having an inherent viscosity in m-cresol of 1.90. On a heated bar, the polymer blackens above 250° C., but does not melt up to 390° C.

The infrared spectrum of the polymer is quite similar to that of N,N′-dimethylpiperazine and has no bands in the vinyl group region. The absence of quaternary ammonium salt cross-linkages is indicated by the complete inertness of the polymer to refluxing with aqueous sodium hydroxide. Elemental analysis is in agreement with the empirical formula $(C_6H_{12}N_2)_n$. These facts are consistent with the assignment of the poly-1,4-ethylenepiperazine structure to the polymer, the repeating unit of which has the structure

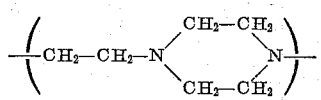

Similar results are obtained by effecting the polymerization at 222° C.

*Example IV*

A salt is prepared by mixing 12.62 parts of the compound 3-azabicyclo[3.2.2]nonane and 15.82 parts of redistilled benzenesulfonic acid in 102 parts of ethyl acetate. The resulting precipitate is recrystallized from an 8:1 mixture of ethyl acetate and ethanol to give 19.9 parts of a salt, M.P. 123.5–124.5° C., which analyzes correctly for a substance having a 1:1 ratio of the bicyclononane: sulfonic acid.

A mixture of 100 parts of 3-azabicyclo[3.2.2]nonane, purified by sublimation at 100° C./15 mm., and 1.05 parts of its benzenesulfonic acid salt described above is polymerized in a sealed glass tube as in Example III at 222° C. for 71 hours. The so-obtained syrupy mixture is cooled, and mixed with diethyl ether to precipitate the polymer, which is then removed by filtration, washed, and dried to give 32 parts of white polymer that melts at 115–130° C. This polymer is somewhat hygroscopic, and has inherent viscosities of 0.30 in m-cresol, 0.37 in tetrafluoropropanol, and 0.46 in 99% formic acid. Analytical data indicate the polymer to be poly[1,4-(2-azatrimethylene cyclohexane], in which the repeating unit has the structure

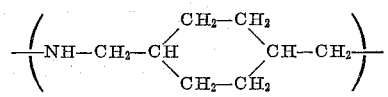

which may also be written as:

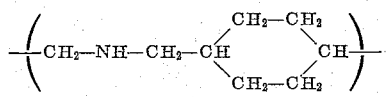

*Example V*

The ion exchange capacity of poly-1,4-ethylene piperazine is determined by equilibrating comminuted polymer with aqueous solutions of metal salts at pH 2.5 and 25° C. for 24 hours. Analysis of the metal ion content of the solution before and after the experiment using radiotracer methods, indicates the amount of metal ion that has combined with the polymer. In this way it is found that 1 gram of the polymer combines with: 1 milliequivalent of ferric ions, or 0.3 milliequivalent of uranyl ions, 0.08 milliequivalent of beryllium ions, or 0.06 milliequivalent of thorium (+4) ions.

The basic nitrogen atom in the polymers of the invention is capable of forming salts and coordination complexes with other materials, thus making the polymers of value in ion exchange resins, membranes having selective permeability, and the like. Coatings, films, or filaments can be prepared from solutions of both polymers by evaporation or coagulation. Poly[1,4-(2-azatrimethylene)cyclohexane] may be shaped from the melt. Shaped structures of the infusible poly(1,4-ethylenepiperazine) may be made directly by bulk polymerization of triethylenediamine within a suitable mold. The basic nature of the nitrogen atom in these polymers also permits their use as additives for other less polar polymers, such as polyolefins, to increase the binding power of the latter toward acid dyes and polar adhesives or coatings. Other uses will be apparent to those skilled in the art.

Numerous equivalent modifications will be apparent to those skilled in the art from the foregoing description without a departure from the inventive concept.

I claim:

1. A novel polymer selected from the group consisting of (*a*) those consisting essentially of recurring structural units of the formula

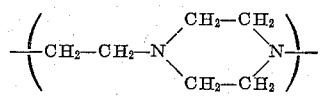

and (*b*) those consisting essentially of recurring structural units of the formula

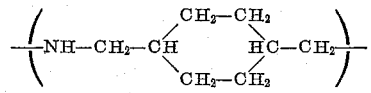

there being more than 5 of said units per polymer molecule.

2. A novel polymer consisting essentially of recurring structural units of the formula

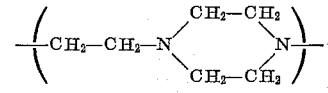

there being more than 5 of said units per polymer molecule.

3. A novel polymer consisting essentially of recurring structural units of the formula

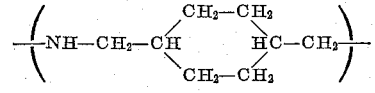

there being more than 5 of said units per polymer molecule.

4. The polymer of claim 1 having an inherent viscosity of at least about 0.30 as measured in m-cresol at 30° C. at a concentration of 0.5 gram of polymer per 100 milliliters of solution.

5. A film comprising the polymer of claim 1.

6. A fiber comprising the polymer of claim 1.

7. The process for preparing a novel polymeric composition comprising heating to a temperature of 100 to 300° C. under substantially anhydrous conditions a mixture of a nitrogen-containing bicycloalkane selected from the group consisting of 1,4-diazabicyclo[2.2.2]octane and 3-azabicyclo[3.2.2]nonane with about 0.01 to 5% by weight of an organic sulfonic acid to effect polymerization, said bicycloalkane being essentially the sole polymerizable component of said mixture.

8. The process of claim 7 wherein the bicycloalklane is 1,4-diazabicyclo[2.2.2]octane.

9. The process of claim 7 wherein the bicycloalkane is 3-azabicyclo[3.2.2]nonane.

10. The process of claim 7 which is conducted in an inert organic medium.

11. The process of claim 7 wherein the heating is conducted at a temperature of 150–250° C.

12. The process of claim 7 wherein the heating is conducted until the polymeric composition has an inherent viscosity of at least about 0.30 as measured in m-cresol at 30° C. at a concentration of 0.5 gram of polymer per 100 milliliters of solution.

References Cited in the file of this patent

UNITED STATES PATENTS

| 2,692,243 | Szwarc | Oct. 19, 1954 |
| 2,932,650 | Cope | Apr. 12, 1960 |